United States Patent Office 3,388,061
Patented June 11, 1968

3,388,061
DRILLING MUD
Aaron E. Markham, Bellingham, Wash., assignor to Georgia-Pacific Corporation, Portland, Oreg., a corporation of Georgia
No Drawing. Original application Sept. 13, 1963, Ser. No. 308,641, now Patent No. 3,325,426, dated June 13, 1967. Divided and this application Mar. 28, 1967, Ser. No. 626,418
34 Claims. (Cl. 252—8.5)

ABSTRACT OF THE DISCLOSURE

A drilling fluid composition comprising a suspension of a clayey material in an aqueous medium, containing a water-soluble oxidized product of a sulfonated lignin-containing material interacted with an alkylolphenol and a process of drilling a well therewith.

---

This is a division of application Ser. No. 308,641, filed Sept. 13, 1963, now U.S. Patent No. 3,325,426.

This invention relates to a drilling mud having excellent water loss properties. More particularly, this invention relates to a drilling mud which contains an additive which functions both as a thinner and as a water-loss preventative.

One of the principal objects of this invention is to provide a drilling mud which, by means of a single additive, is both thinned and improved with respect to water-loss properties.

It is another object of this invention to provide a drilling mud which is thinned with a resin-modified sulfonated lignin-containing material and which does not require the addition of a separate water-loss preventative.

It is still another object of this invention to provide a drilling mud which is thinned with a resin-modified sulfonated lignin-containing material and which does not require the addition of excessive amounts of thinner in order to reduce water loss.

A further object of this invention is to provide a drilling mud thinner effective for controlling water loss having a low cost of preparation, thereby effecting a substantial reduction in cost of controlling water loss in comparison to other methods.

Another object of this invention is to provide a product which will effectively lower water loss with a minimum of adverse effects on other mud properties, in particular without substantial increase in plastic viscosity, yield, or gels. The addition of conventional water-loss agents or excessive amounts of ordinary mud thinners in sufficient amount to lower water loss increases plastic viscosity, yield, and gels of a drilling mud.

A still further object of this invention is to provide a thinner for drilling muds which is resistant to the action of the high temperatures frequently encountered in well drilling, especially in deep wells.

Other objects and advantages of the present invention it is believed will be readily apparent from the following description thereof.

The present invention may be described, in general terms, as a modification and improvement of the drilling mud composition and processes set forth in the King et al. Patents Nos. 2,935,473 and 2,935,504, issued May 3, 1960. These patents describe the use of sulfonated lignin-containing materials which have been modified in various manners to thin drilling muds. While the thinners described in these patents are excellent insofar as their thinning properties are concerned, it has heretofore been necessary, when low water loss in contaminated muds is desired, to add a water-loss agent such as carboxymethyl cellulose or starch to the mud in addition to thinner, or, as disclosed in Examples 22 and 28 of U.S. Patent No. 2,935,473, to add a substantially large excess of thinner over that required for thinning the mud. Furthermore, in drilling oil wells along the seacoast or offshore it is often difficult to obtain fresh water except at great cost, and sea water is commonly used for making up drilling muds. Sea water contains high concentrations of calcium, magnesium, and chloride ions, and as a consequence muds made with sea water have a high water loss and are difficult to thin. When a thinned mud with low water loss is desired, a very expensive treatment is necessary, or the mud must be discarded and replaced with mud made with fresh water. An additive capable of lowering water loss and thinning sea water mud at low cost is thus very desirable. The present invention provides such an additive.

The most significant properties of drilling muds are: (1) initial gel strength; (2) viscosity; (3) ten-minute gel strength; and (4) water loss. The present invention is directed primarily to improving the water loss properties of muds which are excellent insofar as the remaining three properties are concerned.

Water loss relates to the sealing off of the wall of the drilling-hole by building up a filter cake of mud on the wall, thus preventing loss of water from the mud. In practice, drilling muds are used in circulating systems with rotary well drilling mechanisms, in which they are forced by pumping down the follow drill stem, through the bit which is lubricated and cooled by the mud, and then back to the surface to a settling pit. Thus, the mud washes out the cuttings which have been made from the hole and the cuttings are carried outside the drill stem to the surface where the coarse particles are caused to be removed and the mud again used in a continuous circulating process. To prevent the loss of the mud in porous strata, the mud must be of a character to seal off such strata and the mud, by its hydrostatic pressure, must prevent the escape of gas, that is, prevent the well from blowing out. To provide the proper hydrostatic pressure, the specific gravity of the mud may be increased by adding heavier material than clay, such as barytes. On the other hand, the drilling mud must have the proper viscosity, that is, be thick enough to carry out the cuttings, but thin enough to be pumped and allow the coarse particles to settle out in the surface mud pits so that the mud may be re-used. Drilling muds having improved water loss properties are obtained according to the present invention by adding thereto a sulfonated lignin-containing material which has been modified or heated with an alkylolphenol and wherein the sulfonated lignin-containing material has been oxidized prior to the treatment or the products oxidized after the treatment. The complex or salts of metals such as iron, copper, aluminum, and chromium are also especially effective.

Spent lignin liquors from the pulping of wood are one of the basic sources of raw materials for the process and product of the present invention, these liquors being available in large quantity as by-products from the pulping process. The preferred raw material is derived from the pulping of wood by the sulfite process for the manufacture of pulp. In this operation, a substantial portion, e.g., 20%–70%, usually about 55%, of the wood is converted to water-soluble products which at the end of the cooking process are separated from the pulp in water solution. This solution, because of the washings, is very dilute, ranging approximately from 5% to 20% solids. This solution can be used as such in the process of this invention or it can be concentrated in any one of several well-known ways to a more concentrated solution which is more easily and economically handled, particularly because of the smaller volume of liquid involved. The concentrated solution can range from 30% to 70%, but better processing characteristics are obtained in the range of 40%–50% total solids in solution. This concentration of solution contains lignosulfonates as the calcium salts in the case of the calcium bisulfite process or as the magnesium, sodium or amonium salts, depending on which of these are employed in the digesting process, carbohydrates, and other organic compounds derived from wood, as well as inorganic compounds either present in the wood or derived from the reaction. Furthermore, digesting of wood by iron or aluminum bisulfite will give a spent sulfite liquor component which may be the raw material and which will obviate the necessity of a base exchange reaction to form the iron or aluminum salt. The concentrated solution may be used in our invention and highly satisfactory results are obtained with this material. However, the spent sulfite liquor may be further reacted before or after processing according to the present invention. For example, sulfur dioxide may be removed, and the spent sulfite liquor may also be essentially freed of carbohydrates material by any one of a number of procedures, preferably by fermentation. The carbohydrates may also be removed by dialysis, by separation with organic solvents or organic bases, or by precipitation as basic lignosulfonates, for example, with lime or by salting out with salts as calcium chloride or sodium chloride. In addition, the lignosulfonates, as well as being freed as far as possible from extraneous materials, may be fractionated to obtain specific molecular weight components.

Any of the above-described sulfonated lignin-containing materials may be used to produce the drilling mud additive of the present invention. The degree of refining to which these sulfonated lignin-containing materials are subjected, either before or after modification with the alkylolphenol according to the practice of this invention, will depend on the quality of product desired and upon the economics factors involved. That is, refining to some extent will improve the properties of the final processed product, but the degree of improvement will not always be economically justifiable. In fact, it is an outstanding feature of the present invention that concentrated spent sulfite liquor may be used as such, and through a series of simple steps involving equipment which is relatively inexpensive, can produce materials which are nearly equivalent in properties, for instance, for use in drilling mud additives and dispersants, to the purified lignosulfonates.

In general, the lignosulfonates used in this invention may come from any source. Lignin is a complex polymer of substituted aromatic structural units found in plant tissue, associated with cellulose and substituted celluloses. Thus, one of the main sources of lignosulfonates is the paper and pulp industry where lignocellulosic materials such as wood, straw, corn stalks, bagasse, and the like are processed to separate the cellulose or pulp from the lignin. In the sulfite process, the lignin is made soluble by sulfonation and thus separated from the cellulose by dissolving in the spent liquor and is present in this liquor as a lignosulfonate. In other pulping processes, the lignin may be obtained in some other form. However, the product may be sulfonated by various known methods. For example, the lignin products obtained in an alkaline or neutral process of digestion of lignocellulosic materials may be readily sulfonated by reacting with a bisulfite or sulfite.

The alkylolphenols which may be interacted with the sulfonated lignin-containing materials are compounds having an aromatic nucleus to which is attached at least one hydroxyl group (phenolic hydroxy) and at least one hydroxyalkyl group with its hydroxyl in the alpha position to the aromatic nucleus. These compounds may be relatively simple compounds containing one hydroxy aromatic group, such as saligenin, trimethylolphenol, or dimethylolphenol, or they may be more complex compounds having a number of hydroxybenzyl radicals such as may be obtained by the polymerization of a phenol and an aldehyde. Although it is not known for certain, it is believed that some type of an interaction is obtained with the alkylolphenol through the hydroxy radical of the alkylol group and the lignin molecule.

While the alklolphenols may be obtained by other methods, the most common method for their preparation is by the condensation of an aldehyde with a phenol. When the condensation of the aldehyde with a phenol is used for the preparation of the alkylolphenol, the reaction mixture obtained may be used as such. It is not necessary to recover the alkylolphenols or separate them from other constituents of the reaction mixture prior to the reaction with the lignosulfonate material. As is well known in the art, two predominant reactions are obtained in the condensation of an aldehyde with a phenol. In the first reaction, the aldehyde attaches to the phenol to form the alkylolphenol. The hydroxy group of the resulting alkylol radicals is reactive and in the second reaction may combine with other hydroxy aromatic radicals, with or without alkylol groups, forming, for example, dihydroxydiphenyl methane in the condensation of formaldehyde with hydroxybenzene. The formation of the alkylolphenols in the first reaction is favored by alkaline conditions or an alkali catalyst such as alkali metal hydroxide as sodium, potassium, or lithium hydroxide or carbonates, although products containing the alkylol groups may also be obtained in the presence of acid conditions or an acid catalyst. The formation of the alkylolphenol compounds is also favored by increasing the ratio of aldehyde in the reaction mixture as well as by raising the pH.

Alkylolphenols in sufficient concentration in a condensation product may be obtained from polymerization reactions under even acid conditions with as little as a ratio of about 0.8 mole of formaldehyde per mole of phenol. However, generally, it is preferred to use at least one mole of aldehyde for every phenolic nucleus present and to employ an alkali catalyst. Optimum results are obtained using in the range of 1.2 to about 2 moles of aldehyde per aromatic nucleus (phenolic group). A higher ratio of aldehyde to phenol may also be used. Generally, a ratio greater than 3 moles of aldehyde per aromatic radical is seldom employed. In the case of a simple phenol, the aldehyde in excess of 3 moles normally does not react, since the most reactive positions on the benzene ring are the two ortho positions and the one position which is para to the hydroxyl. In some cases, such as dihydroxy benzene, more than three moles of aldehyde per mole of phenol may react.

Even under alkaline conditions and with an excess of aldehyde, some polymerization of the alkylolphenols will take place and if the condensation reaction is continued long enough substantially all of the alkylolphenols formed by the condensation of phenol with the aldehyde will condense to form a polyhydroxypolyphenol polymer. Thus, when the product of an aldehydephenol condensation is used, it is necessary that the aldehydephenol condensation product contain alkylol groups and normally be a liquid at room temperature or be soluble in an alkaline aqueous medium. Operative alkylolphenols may thus be obtained by condensation of the various well known phenols and aldehydes. Illustrative examples of some of the phenols which may be used are hydroxybenzene, resorcinol, pyrocatechol, cresylic acid, cresols, xylenols, naphthols, as well as polyphenols such as the bis hydroxyphenyl alkanes as 2,2′ bis(4-hydroxyphenyl)propane. Illustrative examples of aldehydes which may be used are the aliphatic aldehydes, such as formaldehyde, acetaldehyde, propionaldehyde, butyraldehyde. aromatic aldehydes such as benzylaldehyde, furfural, and such other aldehydes as aldol, glyoxal, and crotonaldehyde.

The interaction or treatment of the lignosulfonate with the alkylolphneol or the condensation product may be simply obtained by intermixing the sulfonated lignin-containing material with the alkylolphenol or the aldehydephenol condensation product for a sufficient time to obtain the desired action. Usually the reaction is carried out in an aqueous medium. The alkylolphenol or the condensation product is thus dissolved in the aqueous medium or dispersed in the medium, if it is only partially soluble. A reaction temperature as low as about 35° C. may be used. However, generally a reaction temperature of at least 60° C. is employed, preferably in the range of about 80° C. to 120° C. Higher temperatures may also be used as long as the temperature is low enough to avoid the thermal decomposition of the lignosulfonate or the alkylolphenol. A temperature above 200° C. is seldom employed.

The reaction time necessary to obtain an effective product will vary with the reaction temperature. At temperatures below about 60° C., considerable time may be required, while in the preferred temperature range, the desired interaction may be obtained in a time of from one hour to 10 hours. However, the reaction time may be extended to over 24 hours, if desired. Above the preferred temperature range, the reaction time required is considerably shorter. At the higher temperatures, five to ten minutes may be sufficient, or just the time necessary to heat the reaction mixture to the higher temperature.

Generally, when a reaction mixture of an aldehyde-phenol is used to supply the alkylolphenol, the condensation of the aldehyde with the phenol is first effected to the extent that the condensation reaction product contains the alkylol groups. This mixture is then added to the lignosulfonate and the resulting mixture is heated to effect the treatment or the interaction between the condensation product and the lignosulfonate. However, it is not necessary to prepare the alkylolphenol prior to the interaction with the lignosulfonate. The alkylolphenol may be prepared in situ. Thus, the aldehyde, the phenol, and the lignosulfonate, in the proper proportions, may be intermixed and the mixture heated under alkaline conditions to effect the reaction. In the reaction, it is believed that the aldehyde condenses first with the phenol to form the alkylolphenol which is then in turn interacted with a lignosulfonate.

Although the ratio of the alkylolphenol to the lignosulfonates may be widely varied, only a small amount of the alkylolphenol is required to obtain a drilling mud additive having the desired properties. Generally, less than 20 weight percent, based upon the dry weight of the lignosulfonate-containing material, is used. Greater amounts of the alkylolphenol may cause adverse effects upon mud properties. The preferred ratio will vary somewhat with the particular lignosulfonate material employed and also upon the particular alkylolphenol or condensation reaction product used. However, generally from 3 to 10 weight percent of the alkylolphenol or of the condensation product containing the alkylolphenol will give the desired product. Appreciable improvement in water loss is obtained with the interaction of as little as 0.25 percent of the alkylolphenol, but generally at least one weight percent of the alkylolphenol is interacted with the lignosulfonate materials.

The oxidation of the lignosulfonate material may be made prior to the treatment with an alkylolphenol or the final product oxidized after the treatment. To obtain the improvement, strong oxidizing agents have to be used, preferably those having an oxidation potential greater than −1.3. However, other oxidizing agents such as nitric acid may be used which may have a lower oxidation potential. Illustrated examples of oxidizing agents which may be used are hydrogen peroxide, ozone, lead dioxide, chromic acid, chlorine, alkali and alkaline earth metal hypochlorites, alkali metal chromates, alkali metal permanganate, alkali metal persulfate, alkali metal perborate, and combinations thereof as well as electrolysis.

No particular method of effecting the oxidation is necessary to obtain the improvement. The methods and processes disclosed in U.S. Patent No. 2,935,473 may be used. The amount of the chemical oxidizing agents used may be widely varied in a range of from 1 to 100 weight percent, based upon the lignosulfonate-containing solids. It is generally preferred to use an amount in the range of 1 to 50 weight percent.

The drilling muds used in the practice of the present invention are essentially aqueous dispersions of clayey material. The additive is generally added to the mud in an amount of from about 0.3 to 20 pounds per barrel, preferably in the range of one to six pounds per barrel. An amount over 10 pounds per barrel is seldom used except in muds where the additive is also employed to function as a water loss additive.

The accepted methods for evaluating materials to ascertain their utility for drilling muds are described in the publication entitled "American Petroleum Institute Code 29," third ed., May 1950, "Recommended Practice on Standard Field Procedure for Testing Drilling Fluids." This manual is prepared and published by the American Petroleum Institute, Division of Production, Dallas, Tex., and specifies the procedures used throughout the industry for testing drilling muds.

In making the laboratory tests on drilling muds according to the procedures mentioned above, it is necessary to use a clay or combination of clays. In general, clays are of extremely wide distribution in the earth's surface and are complex and difficult to define chemically. Although clays have been divided into several classes according to their chemical and physical form, the materials encountered or used in drilling muds are mixtures of these clays and it has become accepted to define these materials in terms of what is known as "yield value." According to this practice, clays are defined in terms of yield value which is the number of barrels of 15 cp. mud that can be prepared from a ton of material, and water. Thus, in the examples, reference is made to the use of natural clay and definition of the "yield value" is made to characterize the type of clay which would give similar results.

By following the standard methods identified above and using clays of defined yield value, the efficacy of the additives prepared by the treatment of the sulfonated lignin-containing materials with an alkylolphenol is measured in terms of initial gel strength, viscosity, ten-minute gel strength, and water loss.

The Stormer viscometer has been used almost universally in making viscosity measurements according to the standard methods of the American Petroleum Institute. Also, let it be noted that another means of measuring viscosity is a motor-driven rotational viscometer known as the Fann V–G Meter (viscosity-gel). This instrument measures two factors of viscosity called "yield value" of fluids and "plastic viscosity" which are so related that two times the plastic viscosity plus the yield value is proportional to the viscosity at 600 r.p.m. Since the plastic viscosity is essentially constant for any one mud, the variation of the yield values indicates directly the variation of viscosity and therefore yield value is reported in the tables where the measurements are made with the Fann instrument.

Generally, only the yield value of the drilling mud is affected by the addition of thinners. Yield values are reduced by drilling mud thinners but plastic viscosity is affected very little. The plastic viscosity can only be changed by adding to or removing water from the mud. The Fann V–G Meter type of instrument is preferred for drilling muds since it indicates whether thinners are needed to lower yield or whether water is needed to decrease plastic viscosity.

The viscosity factor "yield value" of fluids defined above should not be confused with "yield value" of a clay which has been defined hereinabove as the number of barrels of 15 cp. mud that can be prepared from a ton of clay along with water. The following mud test procedures describe in detail the mud preparation and testing procedures used.

The lime mud test procedure to be employed is the same as that described in U.S. Patent No. 2,935,473. As will be seen from the subsequent examples, the water-loss properties of lime base muds are greatly improved by the additive of the present invention.

Fresh water mud test procedure

To 5500 milliliters of distilled water, 15 grams of sodium chloride and 30 grams $CaCO_3$ were added. To the mixture 114 grams of commercial drilling clay having a yield value of 92 barrels of 15 centipoise mud per ton of clay and 690 grams of a commercial drilling clay having a yield value of 45 barrels of 15 centipoise mud per ton of clay were intermixed. The mixture was stirred for one hour at slow speed and then 500 milliliter portions were mixed on a Hamilton Beach Drinkmaster No. 40 mixer at high speed for 30 minutes. The combined portions were stored in a Pyrex bottle for several days or until used. The thinner additive (each gram added equivalent to one pound per barrel) and sodium hydroxide to give the desired pH were then added, the mud mixed five minutes, and again rolled overnight at room temperature. A final five-minute mix was made immediately before measuring viscosity, gels, and water loss by the standard methods of the American Petroleum Institute. The mud may be returned to the bottle and rolled a further twenty-four hours at 150° F. and then retested to obtain information on the effect of elevated temperature.

Gyp mud test procedure

The gyp (or gypsum base) mud test procedure is the same as the fresh water mud test procedure except that six grams (each gram added equivalent to one pound per barrel) of plaster of Paris ($CaSO_4.1/2H_2O$) were added together with the thinner additive, and the mud was subsequently mixed for twenty minutes instead of five minutes.

Sea water mud test

In general terms, sea water mud is similar to fresh water mud, i.e., gypsum or lime are not added to the mud. This mud may be prepared by slowly stirring 20 grams of calcium carbonate, 145 grams of a commercial drilling clay having a yield value of 95 barrels of 15 centipoise mud per ton of clay and 874 grams of a commercial drilling clay having a yield value of 45 barrels of 15 centipoise mud per ton of clay into 4,000 milliliters of sea water taken from Puget Sound. The mud was mixed slowly for one hour and then divided into 500 milliliter portions. These portions were each mixed for one-half hour at 15,000 r.p.m. on a Hamilton Beach No. 30 "Drinkmaster" mixer, and then recombined and allowed to age several days in a Pyrex bottle. The aged mud was then thoroughly mixed and divided into 350 milliliter portions for mud tests. To test the mud, additive thinner, together with sufficient caustic (1.0 milliliter equivalent to 0.25 gram sodium hydroxide) to adjust the pH to 9.5, was mixed into the mud and the mixing continued for five minutes at 15,000 r.p.m. The thinned mud was aged by rolling overnight in a sealed pint bottle, readjusted to pH 9.5 by adding caustic, mixed five minutes at 15,000 r.p.m. and tested immediately for viscosity gels, and water loss according to the procedure recommended in the American Petroleum Institute Code 29.

EXAMPLE I

Solutions of the iron salt of oxidized lignosulfonate having a solids concentration of about 40% were treated with alkali catalyzed hydroxybenzene-formaldehyde condensation mixtures which were prepared as follows, the only variables in formulation being the ratio of the aldehyde to phenol.

| Ingredient | Reaction Product 1 | Reaction Product 2 | Reaction Product 3 |
|---|---|---|---|
| Water (g.) | 46.5 | 44.5 | 40.5 |
| Hydroxybenzene (g.) | 47.0 | 47.0 | 47.0 |
| Formaldehyde (g. of 36.3% solution) | [1] 41.3 | [2] 52.0 | [3] 66.0 |
| 18% sodium hydroxide solution (ml.) | [4] 7.5 | [4] 7.5 | [4] 7.5 |
| Molar ratio, formaldehyde to hydroxybenzene | 1.0 | 1.26 | 1.6 |

[1] 15 g. $CH_2O$.
[2] 19 g. $CH_2O$.
[3] 24 g. $CH_2O$.
[4] 1.6 g. NaOH.

The water, hydroxybenzene, formaldehyde and sodium hydroxide were placed in a condenser-equipped round bottom reaction flask. The products were heated to the boiling point (99° C.) and then refluxed five minutes. They were then cooled and the pH was lowered to the range 6.5–6.8 by adding 10 to 11 grams of 4 N sulfuric acid. The condensation products were soluble in the alkali reaction medium and contained methylolphenol normally obtained by the above reaction.

The method of treating the iron salt of oxidized lignosulfonate solutions with the alkylolphenol or the phenol-aldehyde condensation products was as follows: samples of the solutions of the iron salt of oxidized lignosulfonate containing 100 grams of solids were placed in glass jars and heated to 90° C. While stirring vigorously, 20 grams of a diluted solution of the condensation products, containing about 4.2 grams of solids, was then added dropwise to each sample. The resulting mixtures were then heated in a 90° C. hot water bath for 24 hours. After heating they were centrifuged to remove any heavy insolubles, and were then dried in a 50° C. forced-draft oven. The dried products were evaluated as sea water mud additives and compared with the iron salt of oxidized lignosulfonate which had not been treated with the condensation product of formaldehyde and hydroxybenzene.

The iron salt of oxidized lignosulfonate used in this example was prepared from a solution of fermented, concentrated, steam-stripped spent sulfite liquor, obtained from a comercial pulping of hemlock wood chips, using calcium bisulfite solution with excess sulfur dioxide, which was treated at about 45% total solids concentration with 6% of sodium hydroxide for 16 hours at 90° C. To the resulting solution was added, with vigorous mixing, aqueous solutions containing 3% sulfuric acid and 18% of ferric sulfate (24% iron), both percentages calculated on a basis of the spent liquor solids. To this acidic solution of the iron salt at about 65° C. was then added 8% sodium dichromate dihydrate in solution, with vigorous stirring, and the solution was heated to 90° C. and kept at this temperature for about two hours. The results of the mud tests are as follows:

| Condensation Product Added | Aldehyde to Phenol Ratio | 9 lbs. per Barrel Hot Rolled Sea Water Mud Results | | | |
|---|---|---|---|---|---|
| | | Initial Gel | Yield | 10 Min. Gel | Water Loss |
| No. 1 | 1.0 | 1.0 | 3.5 | 8.0 | 7.4 |
| No. 2 | 1.26 | 2.0 | 4.0 | 10.0 | 5.6 |
| No. 3 | 1.6 | 3.0 | 7.0 | 14.0 | 6.1 |
| None | | 2.0 | 5.5 | 10.0 | 25.4 |

It is apparent from the results that water is markedly decreased in the muds to which the alkylolphenol product has been added.

EXAMPLE II

Solutions of the iron salt of an oxidized lignosulfonate having total solids concentration of about 41% were treated with a solution of industrial grade trimethylolphenol containing 70% solids. The trimethylolphenol was added in an amount of 5% by weight based on the lignosulfonate solids. The methods of treatment were as follows: an amount of solution of the iron salt of oxidized lignosulfonate-containing materials, calculated to contain 100 grams of solids, was placed in a one-pint jar and heated in a hot water bath to 60° C. The contents of the jar were then stirred vigorously while 15 grams of aqueous trimethylolphenol solution containing 3.5 grams of solids was added dropwise. After completing the trimethylolphenol addition, the product was placed in a hot water bath at 92° C. for 18 hours. It was then removed and while still hot was centrifuged to remove any heavy precipitate. The product was dried in a 50° C. force-draft oven.

The dried product was powdered and then evaluated as a gyp mud and a sea water mud additive. It was compared in this capacity with the iron salt of oxidized lignosulfonate-containing materials which received no trimethylolphenol treatment. The results of such tests are shown below:

TABLE I OF EXAMPLE II—GYP MUD

| Drilling Mud Additive | 6 lbs. per Barrel Hot Rolled Gyp Mud | | |
|---|---|---|---|
| | Y | 10 G | WL |
| Iron salt of oxidized ligno-sulfonate treated with trimethylolphenol | 3.0 | 10.0 | 8.0 |
| Untreated iron salt of oxidized lignosulfonate | 3.0 | 8.0 | 11.4 |

TABLE II OF EXAMPLE II—SEA WATER MUD

| Drilling Mud Additive | 9 lbs. per Barrel Hot Rolled Sea Water Mud | | |
|---|---|---|---|
| | Y | 10 G | WL |
| Iron salt of oxidized lignosulfonate treated with trimethylolphenol | 4.5 | 10.0 | 6.4 |
| Untreated iron salt of oxidized lingnosulfonate | 2.5 | 11.0 | 15.5 |

The iron salt of oxidized lignosulfonate used in this example was prepared in the manner described in Example I.

It is clear that the water-loss properties of both the gyp mud and sea water mud were improved by the addition of the trimethylolphenol.

EXAMPLE III

Mixtures of the following materials were prepared: cresylic acid, 10.5 grams; formalin solution, 10.4 grams (36.3% formaldehyde); water, 10.3 grams; 18% sodium hydroxide solution, 1.5 milliliters.

These mixtures, in Erlenmeyer flasks, were shaken to make emulsions and were put on a hot plate where they were heated, the temperature reaching 80° C. in nine minutes. One flask was then removed from the heat, another was removed after five minutes at 80° C. to 85° C., and a third after ten minutes at 80° C. to 85° C. Immediately after removing the flask from the hot plate, each mixture was shaken to form a uniform emulsion and portions were weighed out and were added with vigorous mixing to 40% solutions of the iron salt of oxidized lignosulfonates prepared in the manner described in Example I in solution in water at 70° C. and at a pH of about 4.5. The proportion of condensation product added to the lignosulfonate was 5 grams or 10 grams of the solution of the condensation product per 100 grams of lignosulfonate solids. After mixing, the resulting solution was heated for 24 hours at about 90° C., and then was dried and evaluated as sea water mud thinner, using 9 pounds of thinner per barrel of mud, with the following results.

| Time of Heating of the Aldehyde and Cresylic Acid 80-85° C. minutes | Weight of Condensation Product Sol. per 100 g. Lignosulfonate, grams | 9 lbs. per Barrel Hot Rolled 20-hr. Sea Water Mud | | | |
|---|---|---|---|---|---|
| | | IG | PV | Y | 10 G | WL |
| 0 | 5 | 1.0 | 5.5 | 5.5 | 9.5 | 16.5 |
| 0 | 10 | 1.0 | 5.0 | 4.5 | 9.0 | 7.4 |
| 5 | 5 | 1.5 | 5.0 | 5.0 | 7.0 | 16.2 |
| 5 | 10 | 1.0 | 4.5 | 3.0 | 8.0 | 7.6 |
| 10 | 5 | 1.0 | 5.5 | 2.5 | 6.5 | 25.6 |
| 10 | 10 | 1.0 | 5.0 | 4.0 | 7.0 | 21.0 |
| Irom salt of oxidized lignosulfonate with no condensation product addition | | 1.0 | 4.5 | 3.0 | 7.0 | 30.0 |

EXAMPLE IV

Solutions of the iron salt of an oxidized lignosulfonate prepared in the same manner as that used in Example I were treated with solutions of trimethylolphenol.

The trimethylolphenol was prepared by adding about 9 grams of sodium hydroxide to 18.8 grams of hydroxybenzene (0.2 mole) and intermixing the solution with about 60 grams of formaldehyde solution containing 21.8 g. (0.73 mole) of formaldehyde. The resulting mixture was heated to 50° C., cooled, and more formaldehyde solution, containing 0.1 mole of formaldehyde, was added. The product was maintained at room temperature for three days at about 25° C. before it was added to the lignosulfonate. Two samples of 240 grams each of solution of the iron salt of lignosulfonate solution containing about 100 grams of solids were heated to 90° C. and a predetermined portion of the trimethylol prepared above was added to each of the samples after dilution with water. To one of the samples, sufficient amount of the product was added to contain about 1.3 grams of the original phenol used. In the second sample, the amount added was twice the amount added in the first. The weights of trimethylolphenol were calculated to be 2.5% and 5.0% of the weight of the lignosulfonate respectively in the two samples. The above samples, together with a control sample which contained no trimethylolphenol, were heated at 90° C. for 24 hours, centrifuged to remove sludge, and dried. The dried products were tested as mud thinners, with results as shown below.

| Amount of Trimethylolphenol added, Weight percent | Gyp Mud, 6 lbs./bbl. | | | | | | | |
|---|---|---|---|---|---|---|---|---|
| | Cold Rolled | | | | Hot Rolled | | | |
| | IG | Y | 10 G | WL | IG | Y | 10 G | WL |
| 0 | 1.0 | 3.0 | 7.5 | 8.0 | 0.5 | 3.0 | 7.5 | 10.0 |
| 2.5 | 1.0 | 4.5 | 9.0 | 7.2 | 0.5 | 3.5 | 7.5 | 7.8 |
| 5.0 | 1.0 | 5.0 | 9.5 | 7.3 | 0.5 | 2.5 | 7.5 | 8.2 |

EXAMPLE V

A solution of alkali-catalyzed hydroxybenzene formaldehyde condensation product containing 1.3 moles of aldehyde per mole of phenol, and containing sufficient water to form a solution having a concentration of 42.5% solids, was prepared as follows: into a round bottom reaction flask equipped with a heating mantle and a reflux condenser were placed:

Water _____ 44.5 grams.
Hydroxybenzene _____ 47.0 grams.
Formaldehyde solution (36.3%) _____ 52.0 grams (18.9 g. CH$_2$O).
Sodium hydroxide solution (18%) _____ 7.5 ml. (1.6 g. NaOH).

The product was heated to the boiling point (99° C.) and refluxed for five minutes. It was then cooled and neutralized by the addition of 9 milliliters of 4 N sulfuric acid.

The treatment of the lignosulfonate with the condensation reaction product was performed as follows: first, a 223 gram sample of fermented, steam-stripped spent sulfite liquor containing 100 grams solids was alkali treated by heating with 28 milliliters of 18% sodium hydroxide solution (6% sodium hydroxide based on spent sulfite liquor solids) at 90° C. for 16 hours. After the alkali treatment, the lignosulfonate was maintained at 90° C. and to it was added, while mixing vigorously, 20 milliliters of the diluted aldehyde-phenol condensation product containing about 4.2 grams of solids. The product was heated for 24 hours at 90° C. and was then converted to the iron salt by the addition of 45 grams of a ferric sulfate solution containing 18 grams of ferric sulfate (4.3 grams iron) while stirring, and maintaining the temperature at about 70° C. The product was acidified with 12 grams of 25% sulfuric acid solution (3% $H_2SO_4$ based on original spent sulfite liquor solids) and oxidized with 40 milliliters of 200 g.p.l. sodium dichromate solution (8%

$$Na_2Cr_2O_7 \cdot 2H_2O$$

based on the original spent sulfite liquor solids). The dichromate addition was made to the hot (70° C.) iron salt product while agitating vigorously. After the dichromate addition, the product was heated for two hours at 90° C. and was then centrifuged and dried at 50° C. The dried product was evaluated as a sea water mud additive and compared with the iron salt of an oxidized lignosulfonate which received no treatment with aldehyde-phenol condensation product during its preparation. The results were as follows:

| Additive | 9 lbs. per Barrel Hot Rolled Sea Water Mud | | | |
|---|---|---|---|---|
| | IG | Y | 10 G | WL |
| Iron salt of oxidized lignosulfonate prepared from spent sulfite liquor treated with aldehyde-phenol condensation product | 1.0 | 3.5 | 8.0 | 7.2 |
| Iron salt of oxidized lignosulfonate not treated with aldehyde-phenol condensation product | 1.0 | 2.5 | 7.0 | 33.2 |

It is clear from the table that a vast improvement in the water loss properties of the drilling mud results from the interaction from the lignosulfonate with alkylolphenols.

EXAMPLE VI

An alkali-treated lignosulfonate solution prepared in the manner described in Example V was treated with an industrial grade of trimethylolphenol, and the product was evaluated as a thinner for sea water mud.

For this preparation, a 40% solution containing 199 grams of alkali-treated lignosulfonate solids was heated to 90° C. and to it was added, with vigorous stirring, 4 grams of the trimethylolphenol solids in 16 grams of water. The mixture was maintained for 24 hours at 90° C. and then there were added, with mixing, 500 grams of water, 24 grams of 25% sulfuric acid, 105.6 grams of a solution of chromic sulfate containing 26.4 grams of $Cr_2(SO_4)_3$, and 70 milliliters of a solution containing 14 grams of $Na_2Cr_2O_7 \cdot 2H_2O$. The product was heated for 3.5 hours at 90° C. The pH was 3.7. After removing the precipitate, the product was dried at 50° C.

The tests with sea water mud produce the following results:

| Additive | 9 lbs. per Barrel Hot Rolled Sea Water Mud | | | |
|---|---|---|---|---|
| | IG | Y | 10 G | WL |
| Iron salt of oxidized lignosulfonate to which trimethylol-phenol has been added | 1.0 | 1.5 | 7.0 | 5.8 |
| Iron salt of oxidized lignosulfonate to which trimethylolphenol had not been added | 1.5 | 4.0 | 8.5 | 24.4 |

EXAMPLE VII

Samples of fermented spent sulfite liquor which had been subjected to an alkaline treatment, as described in Example I above, were treated as follows.

| Sample: | Sequence |
|---|---|
| No. 1 | Alkylolphenol treatment, conversion to iron salt, dichromate oxidation. |
| No. 2 | Alkylolphenol treatment, persulfate oxidation, conversion to copper salt. |
| No. 3 | Conversion to iron salt, dichromate oxidation, alkylolphenol treatment. |
| No. 4 | Conversion to iron salt, dichromate oxidation, alkylolphenol treatment. |

The alkylolphenol used in Samples 1 to 3 was an industrial grade trimethylolphenol containing about 41% trimethylolphenol. The product used in Sample 4 was an industrial grade containing about 60% to 70% trimethylolphenol. In each case, the alkylolphenol treatment was performed by adding solutions containing 3.5 grams of the alkylolphenol solids to 100 grams of lignosulfonate in 40% concentration solution, followed by heating for 24 hours at 90° C. The oxidations were accomplished under acidic conditions with either 8% of sodium dichromate or 19% of potassium persulfate and the salts were prepared by adding either 18% ferric sulfate or 29% copper sulfate. The products were adjusted to pH 4 and centrifuged before drying, and were then evaluated in sea water muds. They were compared with an alkoylolphenol treated iron salt of oxidized lignosulfate prepared as described in Example I, an iron salt of lignosulfonate which had not been treated with an alkylolphenol, a copper salt of a non-oxidized lignosulfonate treated with alkylolphenol, and a non-oxidized iron lignosulfonate salt which had been treated with trimethylolphenol.

| Sample | 9 lbs. per Barrel Hot Rolled Sea Water Mud | | | |
|---|---|---|---|---|
| | IG | Y | 10 G | WL |
| No. 1 | 3.0 | 8.0 | 16.0 | 5.3 |
| No. 2 | 1.0 | 4.5 | 13.0 | 13.6 |
| No. 3 | 1.5 | 7.0 | 12.5 | 6.0 |
| No. 4 | 6.0 | 10.0 | 16.0 | 7.2 |
| Additive prepared as in Example I | 1.0 | 3.0 | 11.0 | 10.5 |
| Non-oxidized salt of copper lignosulfonate treated with 5 weight percent trimethylolphenol | 1.5 | 5.0 | 16.0 | 19.0 |
| Iron salt of oxidized lignosulfonate not treated with an alkylolphenol | 3.0 | 5.0 | 11.0 | 28.4 |
| Non-oxidized iron lignosulfonate salt treated with 5 weight percent trimethylolphenol | 4.0 | 7.5 | 15.5 | 29.2 |

EXAMPLE VIII

Two series of operations were performed. In the first series, the alkylolphenol treated iron salt of oxidized ligno-sulfonate was prepared in the usual manner except that untreated spent sulfite liquor was used as a starting material rather than alkali-treated spent sulfite liquor. A similar sample was also prepared in which the alkylolphenol treatment was performed on the finished product, i.e., after oxidation instead of on the starting material. The alkylolphenol used in these preparations was an industrial grade of trimethylolphenol containing the following:

| | Percent |
|---|---|
| Trimethylolphenol | 41 |
| Tetramethylol p,p'-dihydroxy diphenylmethane | 22 |
| o,p-Dimethylolphenol | 9 |
| o,o-Dimethylolphenol | 7 |
| p-Methylolphenol | 6 |
| o-Methylolphenol | 7 |
| Free phenol | 6 |

This product was added in the amount of 2.2 grams of trimethylolphenol solids per 100 grams of lignosulfonate solids. A sample was also prepared which received no treatment with the trimethylolphenol product.

In the second series of operations, the alkylolphenol treated iron salt of oxidized lignosulfonate was prepared using acid-treated spent sulfite liquor and alkali treated liquor as the starting material. The acid treatment involved heating of spent sulfite liquor with 4 percent of sulfuric acid (based on spent sulfite liquor solids) for twenty-four hours at 90° C. The acid treated product was then adjusted to pH 4.4 before treatment with the alkylolphenol. After the treatment, the product was converted to the iron salt and then oxidized. The oxidation was conducted with 6% sodium dichromate dihydrate. Samples were also prepared in a similar manner but without the alkylolphenol treatment or addition.

In order to provide samples to compare with the above products, an additive prepared in accordance with Example I, and an iron salt of oxidized lignosulfonate to which no alkylolphenol was added were prepared in a conventional manner from alkaline treated lignosulfonate. The results were as follows:

TABLE I

| Sequence of Treatment of Spent Sulfite Liquor | 6 lbs. per Barrel Hot Rolled Gyp Mud | | | | |
|---|---|---|---|---|---|
| | IG | PV | Y | 10 G | WL |
| Iron salt formation, oxidation | 1.0 | 6.5 | 2.0 | 5.0 | 10.2 |
| Iron salt formation, oxidation, alkylolphenol treatment | 1.0 | 5.5 | 2.5 | 5.0 | 8.6 |
| Alkylolphenol treatment, iron salt formation, oxidation | 1.0 | 6.0 | 3.5 | 7.5 | 8.8 |
| Acid treatment, iron salt formation, oxidation | 1.5 | 6.0 | 2.0 | 5.0 | 9.0 |
| Acid treatment, alkylolphenol treatment, iron salt formation, oxidation | 1.5 | 5.5 | 3.0 | 4.5 | 7.7 |
| Alkali treatment, iron salt formation, oxidation | 1.0 | 6.5 | 2.0 | 5.0 | 8.6 |
| Alkali treatment, alkylolphenol treatment, iron salt formation, oxidation (as per Example I) | 1.0 | 6.0 | 3.0 | 5.5 | 6.9 |

TABLE II

| Sequence of Treatments of Spent Sulfite Liquor | 9 lbs. per Barrel Hot Rolled Sea Water Mud | | | |
|---|---|---|---|---|
| | IG | Y | 10 G | WL |
| Alkaline treatment, iron salt formation, oxidation | 2.5 | 5.5 | 12.5 | 25.9 |
| Alkaline treatment, alkylolphenol treatment, iron salt formation, oxidation (as per Example I) | 1.5 | 6.5 | 11.5 | 5.6 |
| Acid treatment, iron salt formation, oxidation | 1.5 | 4.0 | 9.0 | 12.6 |
| Acid treatment, alkylolphenol treatment, iron salt formation, oxidation | 1.5 | 4.0 | 12.0 | 5.8 |

EXAMPLE IX

The iron salt of oxidized lignosulfonate was prepared as described in Example I. To this lignosulfonate was added 5% trimethylolphenol (industrial grade, containing about 41% trimethylolphenol) and the mixture was heated at 90° C. The length of time of heating was varied and the results were as follows:

| Hours of Heating, 90°C. | 9 lbs./Barrel Hot Rolled Sea Water Mud | | | |
|---|---|---|---|---|
| | IG | Y | 10 G | WL |
| 1 | 0.5 | 2.0 | 6.5 | 22.8 |
| 6 | 1.0 | 3.5 | 8.5 | 8.3 |
| 24 | 1.5 | 3.0 | 7.0 | 8.5 |
| 0 (no trimethylolphenol product) | 9.5 | 2.0 | 7.0 | 18.2 |

These results show that a certain amount of heating of the alkylolphenol lignosulfonate mixture is required in order to produce the desired improvement in water-loss property of the mud to which the alkylolphenol lignosulfonate mixture is added.

EXAMPLE X

The iron salt of oxidized lignosulfonate was prepared as described in Example I. To this lignosulfonate was added the condensation product of formaldehyde and Bisphenol-A. Bisphenol-A is 2,2-bis(p-hydroxyphenyl)propane. The condensation product was obtained by reacting a mixture containing 50 grams of water, 57.5 grams Bisphenol-A (0.5 equivalent), 53.2 grams of formalin containing 19.5 grams formaldehyde (0.65 mole) and 4.65 milliliters of 18% sodium hydroxide solution containing 1.0 gram sodium hydroxide for 14 minutes at temperatures ranging from 30° C. to 98° C. The reaction was exothermic, and thus required no external heating after an initial application of heat with mixing. The product was refrigerated until used. The product was a liquid which was only partially soluble in water at room temperature, but was completely soluble in alcohol.

Several samples of the iron salt of oxidized lignosulfonate, each at 41.5% concentration and containing 100 grams solids, were heated to 90° C. Two of these samples were treated with different additions of the condensation product of formaldehyde and Bisphenol-A. The two levels of addition were: (1) an amount calculated to contain 1.28 grams of Bisphenol-A; and (2) an amount calculated to contain 2.56 grams of Bisphenol-A. The total weights of the solutions of these products added to the lignosulfonate material are indicated in the table. The products, together with a control sample which received no resin addition, were heated at 90° C. for 24 hours, centrifuged to remove sludge and dried. The dried products were evaluated in gyp and sea water muds. The results were as follows:

| Amount of Condensation Product Added, grams | 6 lbs. per Barrel Hot Rolled Gyp Mud | | | |
|---|---|---|---|---|
| | IG | Y | 10 G | WL |
| 3.7 | 0.5 | 2.5 | 7.5 | 8.5 |
| 7.4 | 9.5 | 3.0 | 7.5 | 8.6 |
| 0 | 9.5 | 3.0 | 7.5 | 10.0 |
| | 9 lbs. Per Barrel Hot Rolled Sea Water Mud | | | |
| 3.7 | 1.0 | 4.0 | 7.5 | 19.3 |
| 7.4 | 0.5 | 3.0 | 5.0 | 9.9 |
| 0 | 1.0 | 4.5 | 17.0 | 30.8 |

These results show that the addition of the Bisphenol-A formaldehyde condensation product substantially decreases water loss without adversely affecting the thinning properties of the mud. Furthermore, although increasing amounts of the condensation product did not produce a substantial difference in results when added to gyp mud, increasing amount did produce substantial improvements of the water loss of the sea water mud.

EXAMPLE XI

The iron salt of oxidized lignosulfonate was prepared as described in Example I. This lignosulfonate material had a concentration of 40% total solids. The lignosulfonate was treated with trimethylolphenol in an amount of 5% by weight based on the total solids and was heated at a temperature of 85° C. at pH 4.3 for 24 hours. After the reaction and heating had been completed, sodium hydroxide was added in varying amounts, and the solutions were centrifuged to remove insoluble matter and dried. The resulting products were tested as thinners for gyp mud and were compared with the iron salt of oxidized lignosulfonate to which no trimethylolphenol had been added and with the iron salt of oxidized lignosulfonate which had been treated with trimethylolphenol but had not been treated with sodium hydroxide. The results were as follows:

| Amount of Sodium Hydroxide, percent by weight Based on Total Solids | 6 lbs./Barrel Hot Rolled Gyd Mud | | |
|---|---|---|---|
| | Y | 10 G | WL |
| 3.9 (pH 7) | 4.0 | 7.0 | 7.6 |
| 4.8 (pH 8) | 3.0 | 8.0 | 7.8 |
| 6.2 (pH 9) | 2.0 | 5.0 | 7.5 |
| 0 | 3.0 | 7.5 | 7.8 |
| 0 (no trimethylolphenol treatment) | 5.0 | 10.0 | 9.8 |

These results show that not only does alkylolphenol treatment improve water loss but that alkaline treatment may improve thinning properties of the alkylolphenol treated additive without adversely affecting water loss.

EXAMPLE XII

A series of runs was made where mixtures of formaldehyde and phenol in a molar ratio of 1.35 to 1, which had not been previously reacted were added to hot solutions of the iron salt of oxidized lignosulfonate prepared in a manner similar to that described in Example I. The concentration of the iron salt of the oxidized lignosulfonate was 30 weight percent. These samples of the solution were adjusted to a pH of 7.8 while three other samples were adjusted to a pH of 9.5 by the addition of sodium hydroxide. Predetermined amounts of the formaldehyde-phenol mixture were added to two of the samples at a pH of 7.8 and to two others at a pH of 9.5. One sample at each pH was used as a control. After the addition of the formaldehyde and the hydroxybenzene, the resulting samples were heated at 90° C. for 24 hours. The solutions were then dried and tested as sea water mud additives, in comparison to the control samples of iron salts of oxidized lignosulfonates to which no formaldehyde or hydroxybenzene had been added.

The results of the test are shown in the table below:

CONDITIONS AND RESULTS OF TREATMENT OF IRON SALT OF OXIDIZED LIGNOSULFONATE WITH PHENOL AND FORMALDEHYDE

| Soln. pH | Addition, per 100 g. Lignosulfonate Solids | | 9 lbs. per Barrel Hot Rolled Sea Water Mud Results | | | |
|---|---|---|---|---|---|---|
| | Phenol, g. | $CH_2O$, g. | IG | Y | 10 G | WL |
| 7.8 | 0 | 0 | 3.5 | 7.0 | 10.5 | 8.8 |
| 7.8 | 1.6 | 0.7 | 3.5 | 6.5 | 12.0 | 7.4 |
| 7.8 | 3.2 | 1.4 | 2.0 | 6.0 | 10.0 | 7.8 |
| 9.5 | 0 | 0 | 3.5 | 7.0 | 12.5 | 8.0 |
| 9.5 | 1.6 | 0.7 | 2.0 | 6.5 | 14.0 | 7.6 |
| 9.5 | 3.2 | 1.4 | 3.0 | 7.5 | 14.0 | 6.2 |

EXAMPLE XIII

A drilling mud additive was prepared from a solution of fermented, concentrated, steam-stripped spent sulfite liquor, obtained from a commercial pulping of hemlock wood chips, using calcium bissulfite solution. This spent sulfite liquor was treated with 5% be weight, based on spent sulfite solids, of a trimethylolphenol product for 24 hours at 90° C., and then, after acidifying with sulfuric acid, four samples were separated. Each of these samples was reacted with a different sulfate selected from the group consisting of ferric, chromium, aluminum, and copper sulfate, the amount of sulfate used being equivalent to 18% by weight ferric sulfate based on the spent sulfite liquor solids. Four similar samples were prepared from the spent sulfite liquor solids. Four similar samples were prepared from the spent sulfite liquor which had not been treated with trimethylolphenol. A ninth sample of spent sulfite liquor which had neither been treated nor reacted with a metal sulfate was also prepared.

| Metal Sulfate | Trimethylolphenol treatment | 9 lbs./Barrel Cold Rolled Sea Water Mud | | | |
|---|---|---|---|---|---|
| | | IG | Y | 10 G | WL |
| Iron | Yes | 4.0 | 7.5 | 15.5 | 29.2 |
| do | No | 2.5 | 5.0 | 12.0 | 36.1 |
| Aluminum | Yes | 2.5 | 5.0 | 16.0 | 26.1 |
| do | No | 1.0 | 3.0 | 12.5 | 46.1 |
| Copper | Yes | 1.5 | 5.0 | 16.0 | 19.0 |
| do | No | 2.5 | 4.0 | 11.5 | 38.0 |
| Chromium | Yes | 1.0 | 2.0 | 6.0 | 7.0 |
| do | No | 1.0 | 2.0 | 3.5 | 30.9 |
| None | No | 3.5 | 6.5 | 13.0 | 38.9 |

These results establish the fact that treatment combined with one of the four metal complexes gives a superior water loss to either the metal complexes without treatment or to the spent sulfite liquor without treatment or metal complex.

It is understood that, in general, the starting materials employed in the practice of the present invention may be produced in any of the diverse methods set forth in the U.S. Patent No. 2,935,473. For example, the oxidation of the lignosulfonate-containing material in the practice of the present invention may be accomplished by the use of hydrogen peroxide, ozone, lead dioxide, chromic acid, chlorine, alkaline and alkaline earth metal hypochlorites, alkali metal chromate, alkali metal permanganate, alkali metal persulfate, alkali metal perborate and combinations thereof, as well as by electrolysis. It has been found that an oxidizing agent having an oxidizing power stronger than an oxidation potential of about $-1.3$ is suitable for the practice of the present invention. Substantial improvement may also be obtained by employing other oxidizing agents having a lower oxidation potential such as nitric acid.

While the reaction product of sulfonated lignin-containing materials with the group of metal ions consisting of iron, chromium, aluminum, copper and mixtures thereof has been described herein as a "salt," it is to be understood that this terminology is used in a broad sense, since the reaction mechanism is not completely understood. It is considered that these reaction products are probably complex salts, i.e., the sulfonated lignin-containing material is probably complexed with the metal ion but the present invention is not to be considered to be dependent on any particular explanation or theory with respect to these reaction products. Thus, although the metals are referred to as being present as cations because of the possibility of the formation of a complex salt, the metals may not be entirely present as cations. But, in any case, the metals are present in soluble form and are herein referred to as salts of sulfonated lignin-containing materials. These metals are preferably added in an amount chemically equivalent to 1–50% of the sulfate salt thereof, based on the weight of the sulfonated lignin-containing solids. When a chemical oxidizing agent is used, it is preferred that this agent also be added in the proportion of 1–50% by weight, based on the weight of the sulfonated lignin-containing material solids.

I claim:

1. A water base drilling fluid composition comprising a suspension of a clayey material in an aqueous medium containing an effective dispersing amount of a water-soluble, oxidized product of a sulfonated lignin-containing material interacted with an alkylolphenol, said alkylolphenol having attached to the aromatic nucleus at least one hydroxyl group and at least one hydroxylalkyl group with the hydroxyl group being in the alpha position with respect to the aromatic nucleus.

2. The drilling fluid composition of claim 1 wherein the alkylolphenol is trimethylolphenol.

3. The drilling fluid of claim 1 wherein said sulfonated lignin-containing material is obtained from spent sulfite liquor.

4. The drilling fluid of claim 1 wherein said sulfonated lignin-containing material is oxidized by electrolyte oxidation.

5. The drilling fluid of claim 1 wherein the water-soluble alkylolphenol is a phenolic-aldehyde condensation product.

6. The drilling fluid of claim 5 wherein said alkylolphenol is a cresylic acid-aldehyde condensation product.

7. The drilling fluid of claim 5 wherein said product is a phenol-formaldehyde condensation product having a formaldehyde to phenol molar ratio of up to about 3:1.

8. The drilling fluid of claim 7 wherein said ratio is within the range of from about 1.2:1 to about 2:1.

9. The drilling fluid of claim 1 wherein said sulfonated lignin-containing material is oxidized with an oxidizing agent having an oxidizing power stronger than an oxidizing potental of about $-1.3$.

10. The drilling fluid of claim 9 wherein said oxidizing agent is selected from the group consisting of hydrogen peroxide, ozone, lead dioxide, chromic acid, chlorine, alkali and alkaline earth metal hypochlorites, alkali metal chromate, alkali metal permanganate, alkali metal persulfate, alkali metal perborate, and combinations thereof.

11. The drilling fluid of claim 10 wherein the oxidizing agent is an alkali metal chromate.

12. A water base drilling fluid composition comprising a suspension of a clayey material in an aqueous medium containing an effective dispersing amount of a water-soluble, oxidized product of a salt of a sulfonated lignin-containing material and an alkylolphenol, said salt having a metal ion selected from the group consisting of iron, chromium, aluminum, copper, and mixtures thereof; said alkylolphenol having attached to the aromatic nucleus at least one hydroxyl group and at least one hydroxylalkyl group with the hydroxyl group being in the alpha position with respect to the aromatic nucleus, and said alkylolphenol being present in an amount of from 0.25 to 20 weight percent, based upon the dry weight of the sulfonated lignin-containing material.

13. The drilling fluid of claim 12 wherein the metal ion is iron.

14. The drilling fluid of claim 12 wherein the metal ion is aluminum.

15. The drilling fluid of claim 12 wherein the metal ion is chromium.

16. The drilling fluid of claim 12 wherein the metal ion is copper.

17. The drilling fluid of claim 12 wherein the iron is present in an amount chemically equivalent to 1 to 50% of the sulfate salt thereof, based on the weight of the sulfonated lignin-containing material.

18. The drilling fluid of claim 12 wherein the alkylolphenol is a condensation product of cresylic acid and an aldehyde.

19. The drilling fluid of claim 12 wherein the alkylolphenol is a condensation product of 2,2-bis (p-hydroxyphenyl) propane and an aldehyde.

20. The drilling fluid of claim 12 wherein the lignosulfonate-containing material is alkaline treated by heating with sodium hydroxide in an aqueous solution.

21. The drilling fluid of claim 12 wherein the alkylolphenol is present in an amount in the range of 3 to 10 weight percent based upon the dry weight of the sulfonated lignin-containing material.

22. The drilling fluid of claim 21 wherein the alkylolphenol is a formaldehyde-hydroxybenzene condensation product having a ratio of aldehyde to phenol in the range of 1.2:1 to 2:1.

23. A water base drilling fluid composition comprising a suspension of a clayey material in an aqueous medium containing an effective dispersing amount of a water-soluble combination of a salt of a sulfonated lignin-containing material and an alkylolphenol, said salt being the reaction product of the sulfonated lignin-containing material with a soluble metal ion selected from the group consisting of iron, aluminum, chromium, copper and mixtures thereof, said metal ion being present in an amount chemically equivalent to 1 to 50% of the sulfate salt thereof, based on the weight of the sulfonated lignin-containing material solids, and said alkylolphenol having attached to the aromatic nucleus at least one hydroxyl group and at least one hydroxyalkyl group with the hydroxyl group being in the alpha position with respect to the aromatic nucleus.

24. A water base drilling fluid composition comprising a suspension of a clayey material in an aqueous medium, containing an effective dispersing amount of a water-soluble combination of a salt of a sulfonated lignin-containing material and an alkylolphenol, said salt being the product of complexing said sulfonated lignin-containing material with a metal selected from the group consisting of iron, aluminum, chromium, copper and mixtures thereof, to produce a soluble product, said metal being present in an amount chemically equivalent to 1 to 50% of the sulfate salt thereof, based on the weight of the sulfonated lignin-containing material solids, and said alkylolphenol having attached to the aromatic nucleus at least one hydroxyl group and at least one hydroxyalkyl group with the hydroxyl group being in the alpha position with respect to the aromatic nucleus.

25. In a method of drilling a well, the improvement comprising circulating in the well the well drilling fluid claim 1.

26. In a method of drilling a well, the improvement comprising circulating in the well the well drilling fluid claim 2.

27. In a method of drilling a well, the improvement comprising circulating in the well the well drilling fluid claim 3.

28. In a method of drilling a well, the improvement comprising circulating in the well the well drilling fluid claim 10.

29. In a method of drilling a well, the improvement comprising circulating in the well the well drilling fluid claim 11.

30. In a method drilling a well, the improvement comprising circulating in the well the well drilling fluid claim 12.

31. In a method of drilling a well, the improvement comprising circulating in the well the well drilling fluid claim 13.

32. In a method of drilling a well, the improvement comprising circulating in the well the well drilling fluid claim 14.

33. In a method of drilling a well, the improvement comprising circulating in the well the well drilling fluid claim 15.

34. In a method of drilling a well, the improvement comprising circulating in the well the well drilling fluid claim 16.

References Cited

UNITED STATES PATENTS

| | | | |
|---|---|---|---|
| 2,849,314 | 8/1958 | Gross | 260—17.5 |
| 2,935,473 | 5/1960 | King et al. | 252—8.5 |
| 3,095,392 | 6/1963 | Herrick | 252—8.5 |
| 3,325,426 | 6/1967 | Markham | 260—17.5 |

LEON D. ROSDOL, *Primary Examiner.*

HERBERT B. GUYNN, *Examiner.*